US012217885B2

(12) United States Patent
Kim et al.

(10) Patent No.: US 12,217,885 B2
(45) Date of Patent: Feb. 4, 2025

(54) METHOD OF PRECISION BEAM COLLIMATION USING FIBER-OPTIC CIRCULATOR AND WAVELENGTH TUNABLE SOURCE

(71) Applicant: X DEVELOPMENT LLC, Mountain View, CA (US)

(72) Inventors: Nam-Hyong Kim, San Jose, CA (US); Andrei Kazmierski, Pleasanton, CA (US); Paul Epp, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 27 days.

(21) Appl. No.: 18/219,853

(22) Filed: Jul. 10, 2023

(65) Prior Publication Data
US 2023/0350139 A1   Nov. 2, 2023

Related U.S. Application Data

(63) Continuation of application No. 17/697,581, filed on Mar. 17, 2022, now Pat. No. 11,747,578, which is a
(Continued)

(51) Int. Cl.
*H04B 10/00* (2013.01)
*C01G 39/00* (2006.01)
(Continued)

(52) U.S. Cl.
CPC ............... *H01B 1/22* (2013.01); *C01G 39/00* (2013.01); *C01G 45/1228* (2013.01);
(Continued)

(58) Field of Classification Search
CPC ...... G02B 6/4221; G02B 6/4225; G02B 27/30; G02B 6/4206; G01M 11/31; G01M 11/0228
See application file for complete search history.

(56) References Cited

U.S. PATENT DOCUMENTS

| 4,867,560 A | 9/1989 | Kunitsugu |
| 5,065,455 A * | 11/1991 | Ito ................. H04B 10/1125 398/122 |

(Continued)

FOREIGN PATENT DOCUMENTS

| CN | 103018920 B | 1/2015 |
| WO | 2015074205 A1 | 5/2015 |

*Primary Examiner* — Agustin Bello
(74) *Attorney, Agent, or Firm* — Botos Churchill IP Law LLP

(57) ABSTRACT

A method of calibrating a collimating lens system includes transmitting, using an optical transmitter, a beam out of an optical fiber and through a collimating lens of the collimating lens system. The beam is reflected off a perfect flat mirror positioned at an output of the collimating lens and back towards the collimating lens, and received, via the collimating lens, at a power meter connected to the optical fiber. The method also includes adjusting a position of a tip of the optical fiber proximal to the collimating lens while tracking a power reading using the power meter, selecting a calibration position of the optical fiber corresponding to a highest power reading, and securing the optical fiber relative to the collimating lens using the calibration position.

20 Claims, 7 Drawing Sheets

Related U.S. Application Data continuation of application No. 16/994,927, filed on Aug. 17, 2020, now Pat. No. 11,307,367.

(51) Int. Cl.

| | | |
|---|---|---|
| *C01G 55/00* | (2006.01) | |
| *G02B 6/42* | (2006.01) | |
| *H01B 1/22* | (2006.01) | |
| *H01B 1/24* | (2006.01) | |
| *H01M 4/131* | (2010.01) | |
| *H01M 4/36* | (2006.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 4/62* | (2006.01) | |
| *H01M 10/052* | (2010.01) | |
| *G02B 27/30* | (2006.01) | |
| *H01M 4/02* | (2006.01) | |

(52) U.S. Cl.
CPC ......... *C01G 45/1242* (2013.01); *C01G 51/42* (2013.01); *C01G 51/50* (2013.01); *C01G 53/42* (2013.01); *C01G 53/50* (2013.01); *C01G 55/00* (2013.01); *G02B 6/4221* (2013.01); *G02B 6/4225* (2013.01); *H01B 1/24* (2013.01); *H01M 4/131* (2013.01); *H01M 4/364* (2013.01); *H01M 4/485* (2013.01); *H01M 4/505* (2013.01); *H01M 4/525* (2013.01); *H01M 4/5825* (2013.01); *H01M 4/623* (2013.01); *H01M 10/052* (2013.01); *C01P 2002/72* (2013.01); *C01P 2002/74* (2013.01); *C01P 2004/50* (2013.01); *C01P 2004/61* (2013.01); *C01P 2006/40* (2013.01); *G02B 27/30* (2013.01); *H01M 4/02* (2013.01); *H01M 2004/021* (2013.01); *H01M 4/625* (2013.01)

(56) References Cited

U.S. PATENT DOCUMENTS

| | | | |
|---|---|---|---|
| 5,305,091 A | 4/1994 | Gelbart et al. | |
| 5,329,395 A * | 7/1994 | Endo | H04B 10/1125 398/124 |
| 5,448,391 A * | 9/1995 | Iriyama | H04B 10/1125 398/129 |
| 5,594,580 A * | 1/1997 | Sakanaka | H04B 10/1125 398/31 |
| 5,627,669 A | 5/1997 | Orino et al. | |
| 5,684,614 A * | 11/1997 | Degura | H04B 10/1121 398/32 |
| 5,959,756 A * | 9/1999 | Keyworth | G02B 26/0808 385/16 |
| 6,049,377 A | 4/2000 | Lau et al. | |
| 6,104,478 A * | 8/2000 | Giggenbach | G02B 26/08 359/896 |
| 6,268,944 B1 | 7/2001 | Szapiel | |
| 6,320,993 B1 | 11/2001 | Laor | |
| 6,351,306 B1 | 2/2002 | Tedesco et al. | |
| 6,370,299 B1 * | 4/2002 | Green | G02B 6/32 359/291 |
| 6,490,070 B1 | 12/2002 | Adams et al. | |
| 6,611,318 B2 | 8/2003 | Lapolice | |
| 6,650,450 B1 | 11/2003 | Orino et al. | |
| 6,654,517 B2 | 11/2003 | Fairchild et al. | |
| 6,801,722 B1 | 10/2004 | Webb et al. | |
| 6,804,008 B1 * | 10/2004 | Morison | G01D 5/35303 356/497 |
| 6,856,712 B2 * | 2/2005 | Fauver | G02B 26/10 385/12 |
| 7,076,171 B2 | 7/2006 | Ohtsubo | |
| 7,129,601 B2 * | 10/2006 | Brown | G02B 26/0816 385/18 |
| 7,136,547 B2 * | 11/2006 | Brown | G02B 6/3572 359/198.1 |
| 7,203,425 B1 | 4/2007 | Keller et al. | |
| 7,231,115 B2 | 6/2007 | Seto et al. | |
| 7,263,297 B2 * | 8/2007 | Verbana | H04B 10/1121 398/171 |
| 7,450,855 B2 | 11/2008 | Ohmuro | |
| 7,522,813 B1 * | 4/2009 | Johnston | G02B 26/101 385/25 |
| 7,583,872 B2 * | 9/2009 | Seibel | A61B 1/00172 385/25 |
| 7,646,986 B2 | 1/2010 | Yasumoto et al. | |
| 7,920,312 B2 * | 4/2011 | Rosman | G02B 26/103 385/25 |
| 8,000,181 B2 | 8/2011 | Yamada | |
| 8,300,230 B2 * | 10/2012 | Galle | G01M 11/3163 356/477 |
| 8,503,837 B2 * | 8/2013 | Beresnev | G02B 6/4226 385/25 |
| 9,099,214 B2 | 8/2015 | Mohammed Al-Saud et al. | |
| 9,632,254 B2 * | 4/2017 | Beresnev | G02B 6/3616 |
| 9,723,386 B1 | 8/2017 | Ni et al. | |
| 10,234,637 B2 | 3/2019 | Lu et al. | |
| 10,371,906 B1 * | 8/2019 | Beresnev | G02F 1/3511 |
| 10,411,797 B1 * | 9/2019 | Mitchell | G02B 6/4249 |
| 10,555,771 B2 * | 2/2020 | Rink | A61B 90/98 |
| 10,969,571 B2 * | 4/2021 | Swanson | G01B 9/02004 |
| 11,462,881 B2 * | 10/2022 | Pino | G02B 6/4216 |
| 2004/0047389 A1 | 3/2004 | Cannon et al. | |
| 2004/0141184 A1 | 7/2004 | Ueki | |
| 2004/0141742 A1 * | 7/2004 | So | G06E 3/00 398/45 |
| 2006/0209297 A1 * | 9/2006 | Biet | G02B 6/4225 356/153 |
| 2006/0245071 A1 | 11/2006 | George et al. | |
| 2009/0219538 A1 | 9/2009 | Myrick et al. | |
| 2009/0310473 A1 | 12/2009 | Katsuura et al. | |
| 2010/0046057 A1 | 2/2010 | Shyu et al. | |
| 2010/0149537 A1 | 6/2010 | Myrick et al. | |
| 2010/0296102 A1 * | 11/2010 | Galle | G01M 11/3163 356/477 |
| 2012/0308239 A1 * | 12/2012 | Sheth | H04B 10/1125 398/131 |
| 2013/0135517 A1 | 5/2013 | Lee | |
| 2014/0204363 A1 | 7/2014 | Slotwinski et al. | |
| 2014/0241665 A1 * | 8/2014 | Beresnev | G02B 27/30 385/33 |
| 2015/0185492 A1 * | 7/2015 | Nagano | G02B 19/0014 359/641 |
| 2015/0201188 A1 | 7/2015 | Pritch et al. | |
| 2017/0122808 A1 * | 5/2017 | Kuga | G01J 3/46 |
| 2018/0275418 A1 | 9/2018 | Beresnev | G02B 6/262 |
| 2018/0351321 A1 * | 12/2018 | Pino | H01S 3/1118 |
| 2019/0219779 A1 * | 7/2019 | Beresnev | G02B 6/32 |
| 2020/0076509 A1 | 3/2020 | Xu et al. | |
| 2020/0100674 A1 | 4/2020 | Yamanari et al. | |
| 2020/0169055 A1 * | 5/2020 | Walton | G02B 17/0808 |
| 2020/0177794 A1 | 6/2020 | Choi et al. | |
| 2020/0343973 A1 | 10/2020 | Geisler et al. | |
| 2021/0148785 A1 * | 5/2021 | Dorronsoro | G01M 11/0257 |
| 2021/0190693 A1 * | 6/2021 | Smith | G02B 27/0927 |
| 2022/0045754 A1 * | 2/2022 | Coward | H04B 10/1125 |
| 2022/0050253 A1 * | 2/2022 | Kim | G01M 11/31 |
| 2022/0085885 A1 * | 3/2022 | Rein | H04B 10/67 |
| 2022/0107473 A1 * | 4/2022 | Brinkley | G02B 6/4225 |
| 2022/0206234 A1 * | 6/2022 | Kim | G01M 11/31 |

* cited by examiner

METHOD OF PRECISION BEAM COLLIMATION USING FIBER-OPTIC CIRCULATOR AND WAVELENGTH TUNABLE SOURCE

CROSS REFERENCE TO RELATED APPLICATIONS

The present application is a continuation of U.S. patent application Ser. No. 17/697,581, filed Mar. 17, 2022, which is a continuation of U.S. patent application Ser. No. 16/994,927, filed Aug. 17, 2020, now U.S. Pat. No. 11,307,367, the entire disclosures of which are incorporated by reference herein.

BACKGROUND

Information can be transmitted over directional point-to-point networks, such as aerospace and other mobile networks. In such networks, links can be formed between pairs of nodes, or terminals at each node, by aiming lens systems of each node pair towards each other. In some implementations, the nodes may transmit and receive optical signals through free space optical communication (FSOC) links.

BRIEF SUMMARY

Aspects of the disclosure provide for a method of calibrating a collimating lens system. The method includes transmitting, using an optical transmitter, a beam out of an optical fiber and through a collimating lens of the collimating lens system; reflecting the beam off a perfect flat mirror positioned at an output of the collimating lens and back towards the collimating lens; receiving, via the collimating lens, the reflected beam at a power meter connected to the optical fiber; adjusting a position of a tip of the optical fiber proximal to the collimating lens while tracking a power reading using the power meter; selecting a calibration position of the optical fiber corresponding to a highest power reading; and securing the optical fiber relative to the collimating lens using the calibration position.

In one example, the collimating lens system includes a collimator and an afocal telescope. In another example, the reflecting of the beam includes adjusting the perfect flat mirror using a tip-tilt mount so the beam is reflected back towards the collimating lens. In a further example, the adjusting of the position includes moving the optical fiber along a center axis of the collimating lens. In yet another example, the adjusting of the position of the tip of the optical fiber includes using one or more processors to control a motor that is connected to the tip of the optical fiber.

In a still further example, the securing of the optical fiber includes fixing the optical fiber relative to the collimating lens in the calibration position. In another example, the method also includes positioning an afocal telescope at the output of the collimating lens; adjusting a position of one or more lenses of the afocal telescope while tracking a second power reading using the power meter; selecting a second calibration position of the one or more lenses corresponding to a highest second power reading; and securing the one or more lenses using the second calibration position. In a further example, the method also includes assembling the collimating lens system into an optical communication device after securing the optical fiber relative to the collimating lens.

Other aspects of the disclosure provide for a calibration system for a collimating lens system. The calibration system includes a perfect flat mirror positioned to reflect a first beam transmitted by the collimating lens system back to the collimating lens system, an optical transmitter, a power meter, and an optical circulator having a first port configured to receive a second beam from the optical transmitter, a second port configured to output the second beam and receive the first beam from the collimating lens system, and a third port configured to output the first beam to the power meter.

In one example, the perfect flat mirror is positioned using a tip-tilt mount. In another example, the optical transmitter is a wavelength tunable laser. In a further example, the calibration system also includes one or more processors configured to move an optical fiber of the collimating lens system relative to a collimating lens of the collimating lens system; track a power reading for each position of the optical fiber using the power meter; and select a calibration position of the optical fiber corresponding to a highest power reading. In this example, the calibration system optionally also includes a motor configured to move a tip of the optical fiber. Further in this example, the calibration system optionally also includes a mechanical arm connecting the tip of the optical fiber with the motor. Also in the further example, the one or more processors are optionally configured to move the optical fiber until the calibration position is selected.

Further aspects of the disclosure provide for a tangible, non-transitory computer-readable storage medium configured to store instructions. The instructions, when executed by one or more processors, cause the one or more processors to perform a method. The method includes transmitting, using an optical transmitter of a calibration system, a beam through a lens system towards a perfect flat mirror, wherein the beam is reflected off the perfect flat mirror and back through the lens system; adjusting, using a motor, a position of a tip of an optical fiber of the lens system proximal to a collimating lens of the lens system; tracking a power reading of the reflected beam using a power meter that receives the reflected beam from the optical fiber of the lens system; and selecting a calibration position of the optical fiber corresponding to a highest power reading.

In one example, the method further comprises holding the optical fiber in the calibration position. In another example, the adjusting of the position includes moving the tip of the optical fiber along a center axis of the collimating lens. In a further example, the method also includes adjusting the perfect flat mirror to reflect the beam back through the lens system. In this example, the adjusting of the perfect flat mirror optionally includes moving the perfect flat mirror using a tip-tilt mount.

DETAILED DESCRIPTION

Overview

The technology relates to calibrating a lens system so that beams transmitted by the lens system are collimated. The lens system may be for an optical communication terminal, an afocal telescope, or other type of device where collimated beams are required for transmission or receipt. The calibration may be performed using a perfect flat mirror during manufacture of the device.

The calibration system and method described herein may produce very precise collimators. The proposed calibration is indirectly quantitative, inferring wavefront precise focus alignment using received power. In addition, the proposed calibration may be performed on any wavelength beam and any size beam as long as a large enough perfectly flat mirror is used. Sourcing a perfectly flat mirror may be less expensive than sourcing interferometers or wavefront sensors. Automation and scaling for production may be easily achieved at a low cost.

Example Systems

Figure 1:
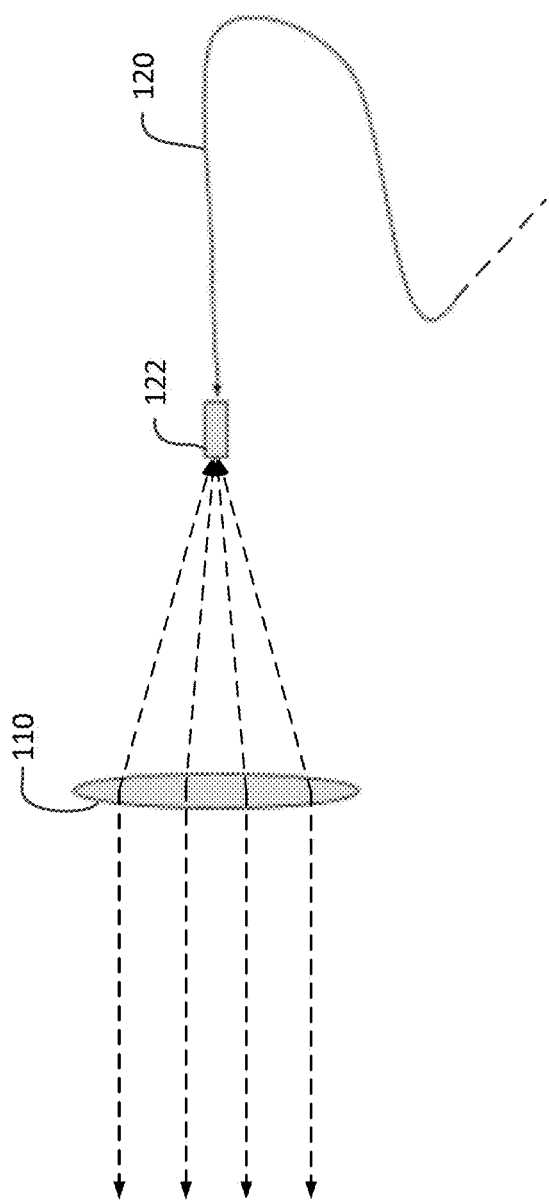
FIG. 1 is a pictorial diagram of a lens system in accordance with aspects of the disclosure.

A lens system may include a collimating lens or lens group and a single mode optical fiber. For example, the lens system may be a collimator. The collimating lens or lens group may be configured to receive a beam and direct the beam to a tip of the optical fiber. A beam transmitted from the optical fiber may be collimated using the collimating lens or lens group and transmitted out into free space. Shown in FIG. 1 is a lens system 100 that includes a collimating lens 110 and an optical fiber 120. The optical fiber 120 has a tip 122 proximal to the collimating lens, positioned to receive a beam via the collimating lens 110 and direct a beam towards the collimating lens 110.

Figure 2:
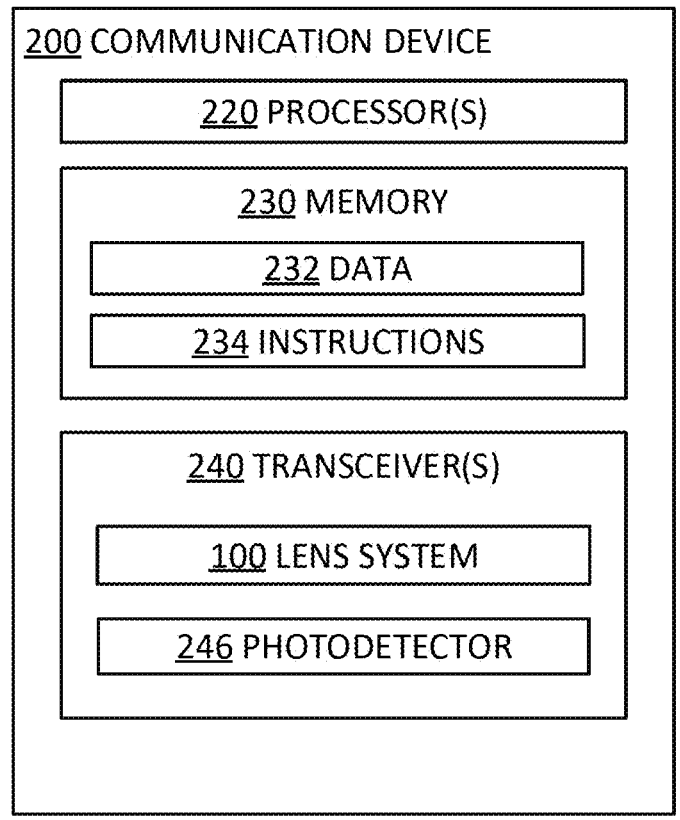
FIG. 2 is a functional diagram of a communication device in accordance with aspects of the disclosure.

The lens system may be assembled in a device, such as an optical communication device shown in FIG. 2. The optical communication device 200 may be configured to form one or more communication links with other optical communication devices. The optical communication device may include one or more processors 220, a memory 230, and one or more transceivers 240. The one or more transceivers may include the lens system 100 and a photodetector 246.

The one or more processors 220 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 220 and memory 230 as being within the same block, it will be understood that the one or more processors 220 and memory 230 may actually comprise multiple processors and memories that may or may not be stored within the same physical housing. Accordingly, references to a processor or computer will be understood to include references to a collection of processors or computers or memories that may or may not operate in parallel.

Memory 230 stores information accessible by the one or more processors 220, including data 232 and instructions 234 that may be executed by the one or more processors 220. The memory may be of any type capable of storing information accessible by the processor, including a computer-readable medium such as a hard-drive, memory card, ROM, RAM, DVD or other optical disks, as well as other writecapable and read-only memories. The system and method may include different combinations of the foregoing, whereby different portions of the instructions and data are stored on different types of media.

Data 232 may be retrieved, stored or modified by the one or more processors 220 in accordance with the instructions 234. For instance, although the system and method are not limited by any particular data structure, the data 232 may be stored in computer registers, in a relational database as a table having a plurality of different fields and records, XML documents or flat files.

Instructions 234 may be any set of instructions to be executed directly (such as machine code) or indirectly (such as scripts) by the one or more processors 220. For example, the instructions 234 may be stored as computer code on the computer-readable medium. In that regard, the terms "instructions" and "programs" may be used interchangeably herein. The instructions 234 may be stored in object code format for direct processing by the one or more processors 220, or in any other computer language including scripts or collections of independent source code modules that are interpreted on demand or compiled in advance. Functions, methods and routines of the instructions 234 are explained in more detail below.

The one or more transceivers 240 may be configured to transmit a beam via the optical fiber 120 and the collimating lens 110 out into free space. In addition, in the one or more transceivers 240, the optical fiber 120 may be configured to receive light, such as a beam transmitted from a remote communication device, via the collimating lens 110. The optical fiber 120 may also be configured to relay the received beam towards the photodetector 246. The photodetector 246 may be configured to detect light received at the surface of the photodetector, such as from the beam, and may convert the received light into an electrical signal using the photoelectric effect.

Figure 3:
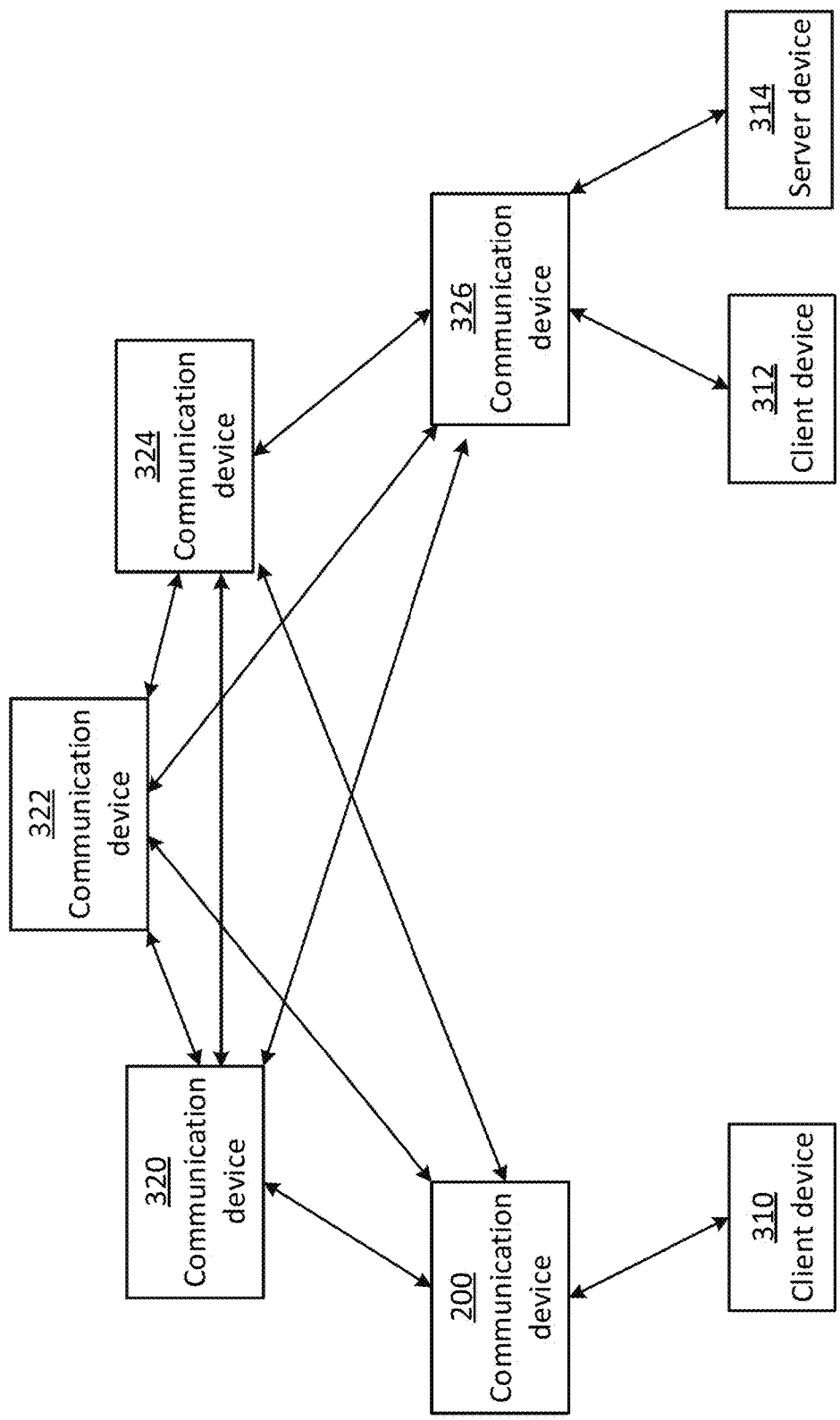
FIG. 3 is a functional diagram of a network in accordance with aspects of the disclosure.

The one or more transceivers 240 may be configured to transmit and receive optical frequencies via cable, fiber, or free space. One or more additional transceivers may also be included that are configured to transmit and receive radio frequencies or other frequencies. The one or more transceivers 240 are configured to communicate with one or more other communication devices via one or more communication links. In FIG. 3, the communication device 200 is shown having communication links (illustrated as arrows) with client device 310 and communication devices 320, 322, and 324.

With a plurality of communication devices, the communication device 200 may form a communication network, such as network 300 in FIG. 3. The network 300 includes client devices 310 and 312, server device 314, and communication devices 200, 320, 322, 324, and 326. Each of the client devices 310, 312, server device 314, and communication devices 320, 322, 324, and 326 may include one or more processors, a memory, and one or more transceivers. The one or more processors may be any well-known processor or a dedicated controller similar to the one or more processors described above. The memory may store information accessible by the one or more processors, including data and instructions that may be executed by the one or more processors. The memory, data, and instructions may be configured similarly to memory 230, data 232, and instructions 234 described above. Using the one or more transceivers, each communication device in network 300 may form at least one communication link with another communication device, as shown by the arrows. The communication links may be for optical frequencies, radio frequencies, other frequencies, or a combination of frequency bands.

Figure 4:
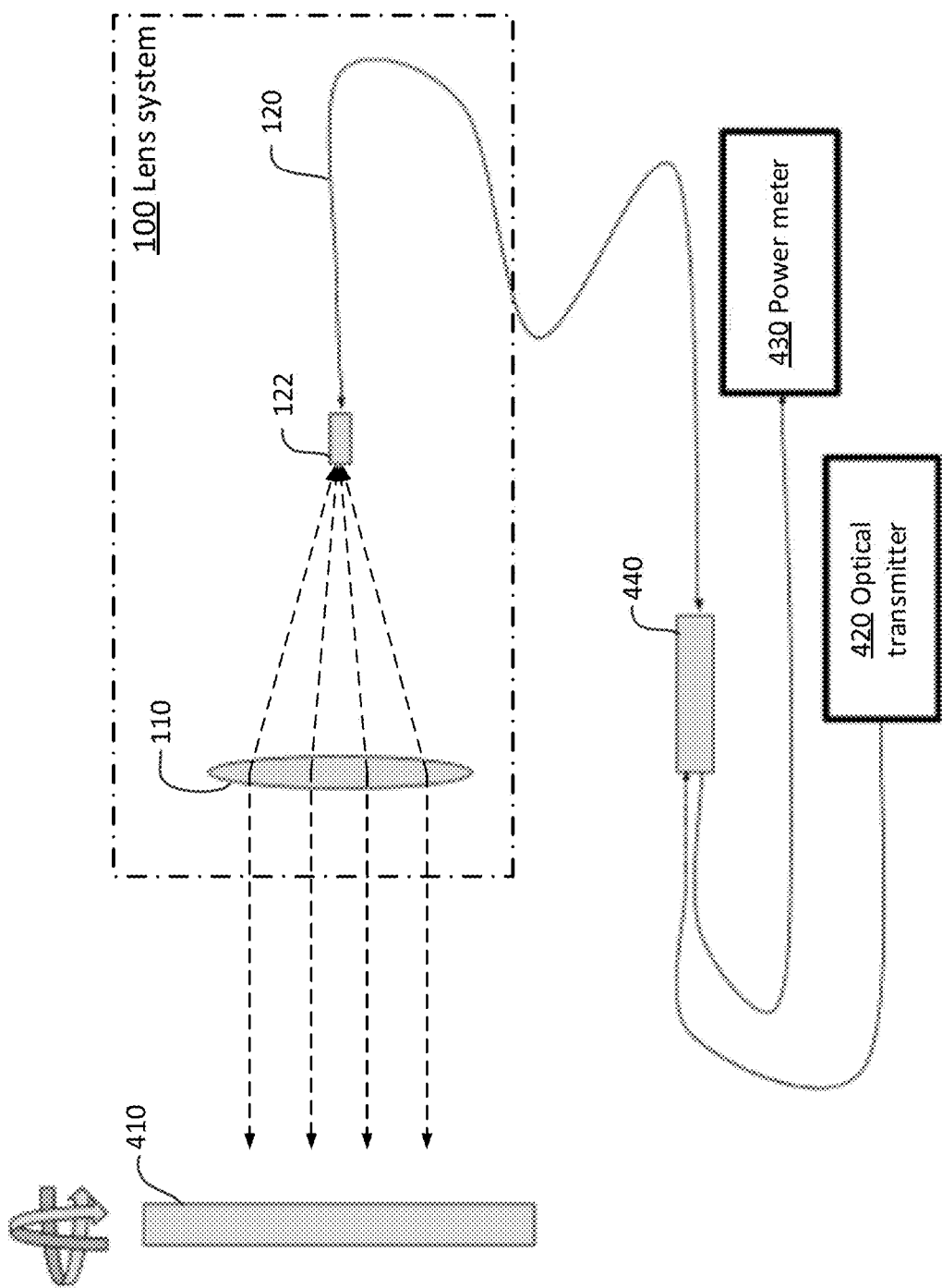
FIG. 4 is a pictorial diagram of a calibration system in accordance with aspects of the disclosure.
Figure 5:
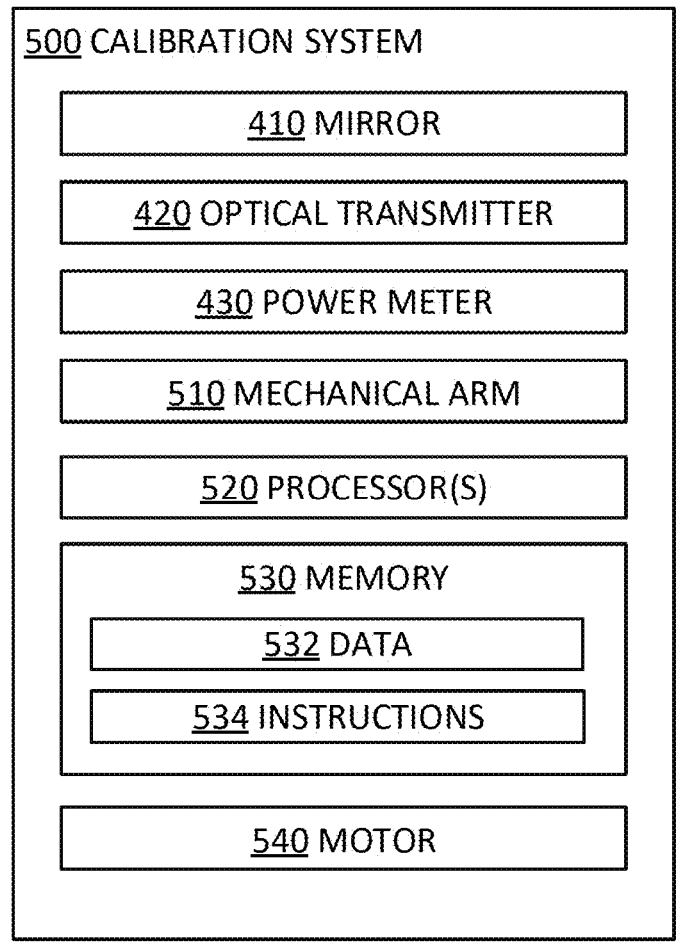
FIG. 5 is a functional diagram of another calibration system in accordance with aspects of the disclosure.

The lens system 100 may be calibrated using a calibration system, such as the calibration system 400 shown in FIGS. 4 and 5. The calibration system 400 may include a perfect flat mirror 410 positioned at an output end of the lens system. The perfect flat mirror 410 may be positioned at least approximately orthogonal to a beam transmitted from the lens system such that a beam transmitted from the lens system may be reflected back to the lens system. In some implementations, the perfect flat mirror may be on a tip-tilt mount so the angle of the mirror may be easily adjusted relative to a position of the lens system. The calibration system may also include an optical transmitter 420, such as a laser, configured to transmit a beam through the optical fiber and the lens system, and a power meter 430 configured to receive a beam from the optical fiber 120 of the lens system. Alternatively, a near-perfect flat mirror with known flatness variations may be utilized in place of the perfect flat mirror.

In some implementations, the optical fiber 120, the optical transmitter 420, and the power meter 430 may be connected using an optical circulator 440. The optical fiber 120 may be connected to a first port of the optical circulator 440; the power meter 430 may be connected to a second port of the optical circulator 440 configured to output a beam received at the first port; and the optical transmitter 420 may be connected to a third port of the optical circulator 440 configured to output a beam at the first port.

In another example, a calibration system 500 may also include a mechanical arm 510, such as a gimbal, configured to hold the optical fiber 120 and move the tip 122 of the optical fiber in relation to the collimating lens 110. The calibration system 500 may additionally include one or more processors 520, a memory 530 including data 532 and instructions 534, and a motor 540. The motor 540 may be connected to the mechanical arm 510 and configured to move the mechanical arm 510. The instructions 534 may include instructions executable by the one or more processors 520 to move the optical fiber 120 by controlling the motor 540.

The one or more processors may be any well-known processor or a dedicated controller similar to the one or more processors described above. The memory may store information accessible by the one or more processors, including data and instructions that may be executed by the one or more processors. The memory, data, and instructions may be configured similarly to memory 230, data 232, and instructions 234 described above.

Example Operations

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

To calibrate a lens system, such as the lens system 100, the optical transmitter 420 in the calibration system 400 may transmit a beam out of the optical fiber 120. The beam may be transmitted through the lens system 100, towards the perfect flat mirror 410. The beam reflects off the perfect flat mirror 410 back towards the lens system 100. The reflected beam may be received at the optical fiber 120 and directed to the power meter 430 of the calibration system.

The lens system 100 may be adjusted to determine a calibrated configuration that produces the highest amount of power received at the power meter 430. The adjustment to the lens system 100 may include adjusting a position of the optical fiber 120 in any direction relative to the collimating lens 110. For example, the adjustment may be made by moving a tip 122 of the optical fiber closer to or farther away from the collimating lens 110 along a center axis of the collimating lens. The center axis may also be collinear with a focal point of the collimating lens 110. The adjustment may also be made additionally or alternatively by moving the tip 122 of the optical fiber closer to or farther away from the center axis. At each position of the tip 122 of the optical fiber along the center axis, a power reading may be determined using the power meter 430. A position that corresponds to a highest power reading may be selected for use in the calibrated configuration of the lens system 100.

In some implementations, the adjustment of the optical fiber 120 may be automated using the calibration system 500 that has the one or more processors 520 and the motor 540. The one or more processors 520 may be configured to move the tip 122 of the optical fiber in along the center axis of the collimating lens 110 using the motor 540. While moving the tip 122 of the optical fiber, the one or more processors 520 may obtain a power reading for each point along the center axis. The one or more processors 520 may select a position of the tip 122 of the optical fiber that corresponds to the point having the highest power reading. Once the position of the tip 122 of the optical fiber corresponding to the point having the highest power reading is selected, the adjustment of the optical fiber may be stopped.

The lens system 100 may be secured in the calibrated configuration. For example, the tip 122 of the optical fiber and the collimating lens 110 may be secured according to the selected position of the optical fiber 120 relative to the collimating lens 110. The lens system 100 may be secured using mechanical means, such as screws or bolts, and/or adhesives. The collimating lens 110 may be secured by being mounted on a precision tip-tilt mechanism.

The calibrated lens system 100 may then be assembled in a device. For example, the calibrated lens system 100 may be assembled in the optical communication device 200 described above as part of the one or more transceivers 240.

Figure 6:
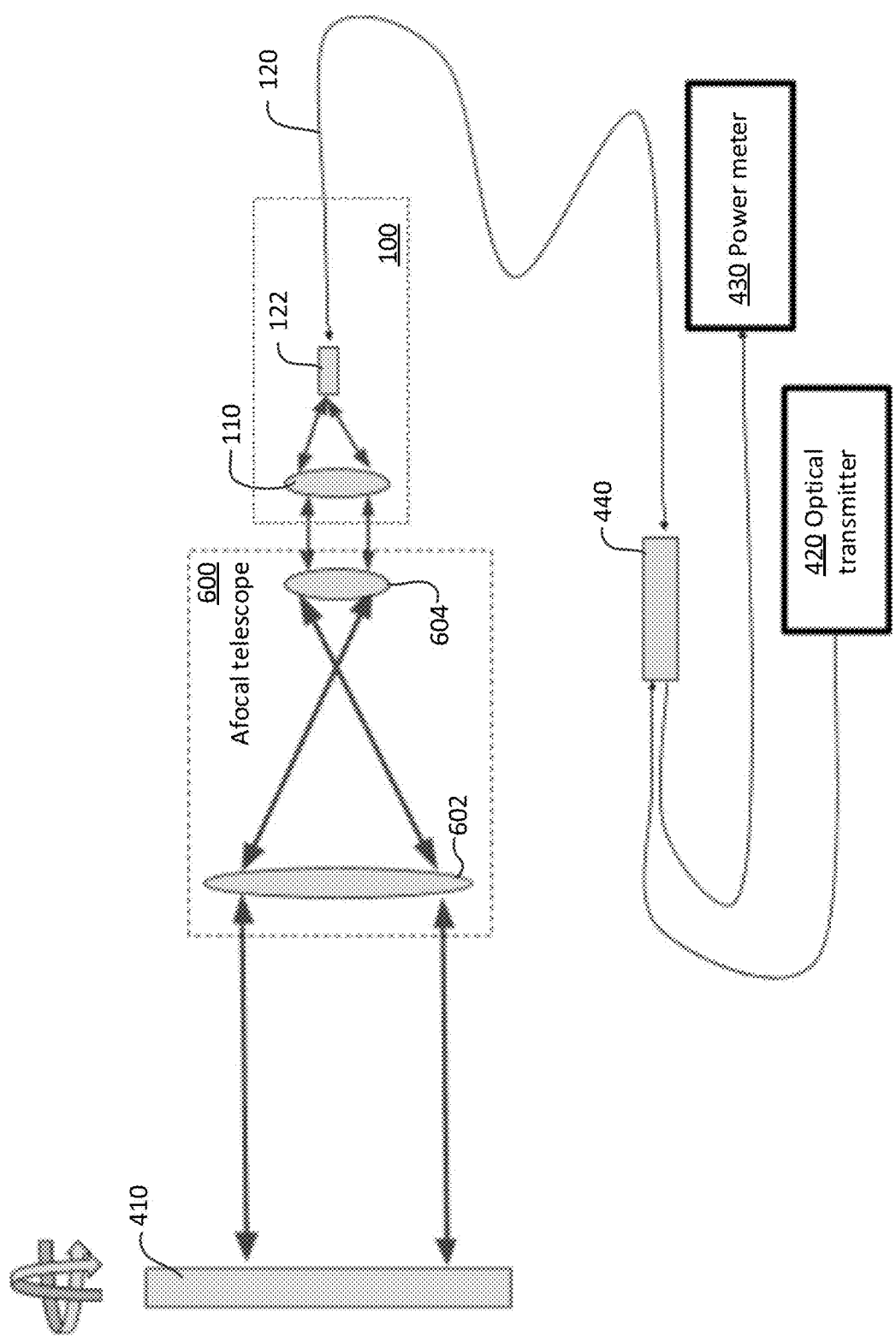
FIG. 6 is a pictorial diagram of a further calibration system in accordance with aspects of the disclosure.

Alternatively, the calibrated lens system may be used to calibrate another lens system requiring collimation, such as an afocal telescope. As shown in FIG. 6, the calibrated lens system 100 may be connected to the optical transmitter 420 and the power meter 430 and positioned pointed towards the mirror 410 similar to the set up in FIG. 4. An afocal telescope 600 including a first lens 602 and a second lens 604 may be positioned between the mirror 410 and the calibrated lens system 100. Adjustments to the first lens 602, the second lens 604, or other component of the afocal telescope 600 may be performed while tracking a power reading using the power meter 430, in a same or similar way as described above with respect to adjusting the tip 122 of the optical fiber of the lens system 100. A calibrated configuration for the afocal telescope 600 may be the configurations of the first lens 602, the second lens 604, and/or other adjusted components that corresponds to a highest power reading.

In some alternative implementations, a wavelength tunable laser may be utilized as the optical transmitter 420 of the calibration system. A focus of the lens system 100 may be calibrated using the wavelength tunable laser with minimum iteration. For example, one or more lenses of the lens system 100 may have an amount of residual chromatic aberration, causing dispersion of light in the one or more lenses. The focal length of the one or more lenses may change a known amount with varying wavelengths due to the dispersion. While the collimating lens 110 and the optical fiber 120 of the lens system are at a set distance, the wavelength tunable laser may output a beam and vary the wavelength of the beam. While the wavelength of the beam is varied, a power reading may be determined using the power meter 430. A wavelength that corresponds to a highest power reading may be determined. Based on a difference between the determined wavelength and a desired wavelength for the lens system 100, a distance adjustment for the optical fiber 120 relative to the collimating lens may be determined based on the known amount of change of the focal length between the wavelengths.

Figure 7:
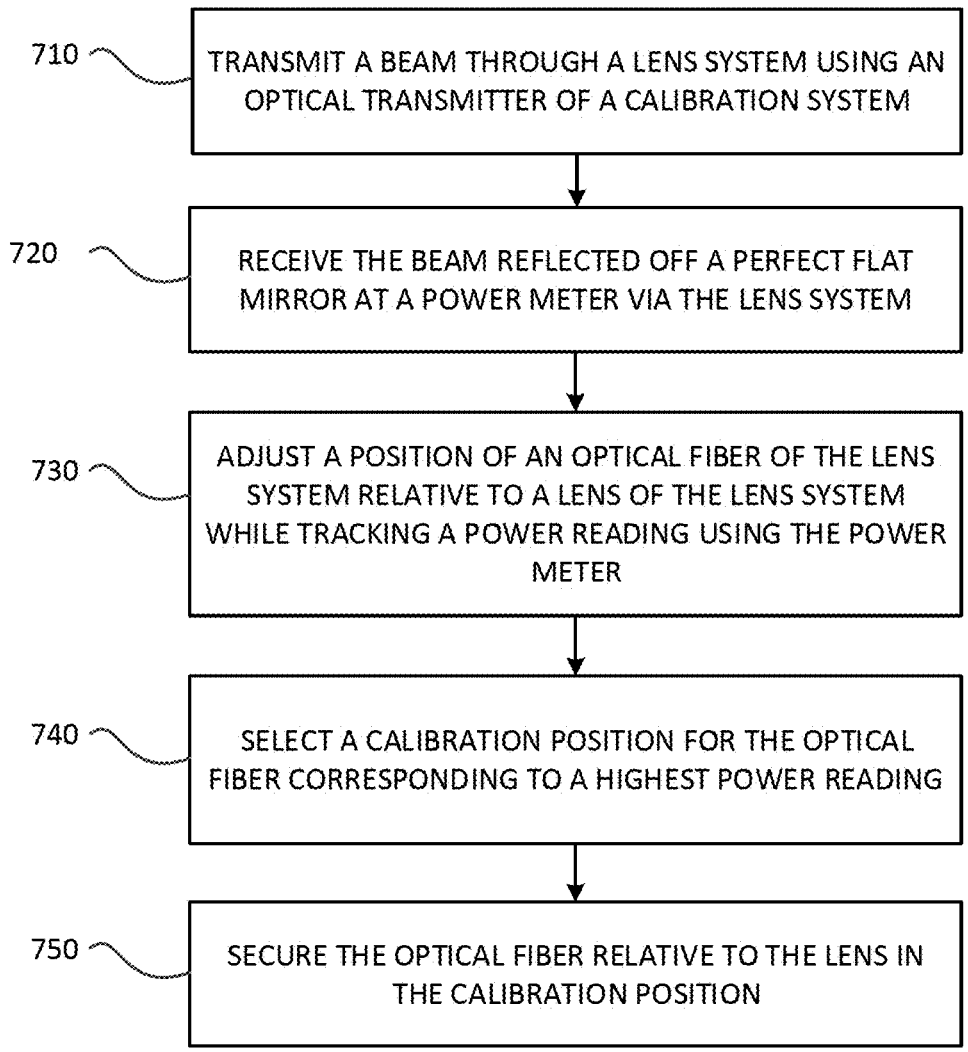
FIG. 7 is a flow diagram of an example operation in accordance with aspects of the disclosure.

In FIG. 7, flow diagram 700 is shown in accordance with some of the aspects of the calibration process described above. While FIG. 7 shows blocks in a particular order, the order may be varied and that multiple operations may be performed simultaneously. Also, operations may be added or omitted.

At block 710, a beam may be transmitted through a lens system using an optical transmitter. At block 720, the beam may be received at a power meter via the lens system after it is reflected off a perfect flat mirror. At block 730, a position of an optical fiber of the lens system may be adjusted relative to a lens of the lens system while tracking a power reading using the power meter. At block 740, a calibration position for the optical fiber corresponding to a highest power reading may be selected. At block 750, the optical fiber may be secured relative to the lens in the calibration position.

The features described herein may produce very precise collimators. The proposed calibration is indirectly quantitative, inferring precise focus alignment using received power. In addition, the proposed calibration may be performed on any wavelength beam and any size beam as long as a large enough perfectly flat mirror is used. Sourcing a perfectly flat mirror may be less expensive than sourcing interferometers or wavefront sensors. Automation and scaling for production may be easily achieved at a low cost.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of calibrating a collimating lens system, the method comprising:
    receiving, via a collimating lens, a beam at a power meter connected to an optical fiber;
    varying, using one or more processors, a wavelength of the beam produced by an optical transmitter across a set of wavelengths while tracking a power reading at each wavelength using the power meter;
    determining, using the one or more processors, a particular wavelength of the set of wavelengths that corresponds to a highest power reading based on the tracking of the power reading at each wavelength using the power meter;
    determining, using the one or more processors, a distance adjustment for the optical fiber based on a difference of a focal length of the particular wavelength and a focal length of a desired wavelength for the collimating lens system; and
    actuating, using the one or more processors, a motor configured to move a tip of the optical fiber based on the determined distance adjustment.

2. The method of claim 1, further comprising transmitting, using the optical transmitter, the beam out of the optical fiber and through the collimating lens of the collimating lens system.

3. The method of claim 2, further comprising reflecting the beam off a flat mirror positioned at an output of the collimating lens and back towards the collimating lens.

4. The method of claim 3, wherein the reflecting of the beam includes adjusting the flat mirror using a tip-tilt mount so the beam is reflected back towards the collimating lens.

5. The method of claim 1, wherein the optical transmitter is a wavelength tunable laser.

6. The method of claim 1, further comprising adjusting, using the motor configured to move the tip of the optical fiber, a position of the tip of the optical fiber proximal to the collimating lens.

7. The method of claim 6, further comprising securing the optical fiber relative to the collimating lens.

8. The method of claim 7, wherein the securing of the optical fiber includes fixing the optical fiber relative to the collimating lens.

9. The method of claim 8, wherein fixing the optical fiber relative to the collimating lens includes use of screws, bolts, or adhesives.

10. The method of claim 1, wherein actuating, using the one or more processors, the motor configured to move the tip of the optical fiber based on the determined distance adjustment includes actuating a mechanical arm connecting the tip of the optical fiber with the motor.

11. A calibration system for a collimating lens system, the calibration system comprising:
    an optical transmitter configured to transmit a beam out of an optical fiber;
    a power meter;
    a motor configured to move a tip of the optical fiber relative to a collimating lens of the collimating lens system; and
    one or more processors configured to:
    vary a wavelength of a beam produced by the optical transmitter while tracking a power reading at each wavelength across a set of wavelengths using the power meter;
    determine a particular wavelength of the set of wavelengths that corresponds to a highest power reading based on the tracking of the power reading at each wavelength using the power meter;
    determine a distance adjustment for the optical fiber based on a difference of a focal length of the particular wavelength and a focal length of a desired wavelength for the collimating lens system; and
    actuate, the motor configured to move the tip of the optical fiber based on the determined distance adjustment.

12. The calibration system of claim 11, further comprising a mirror positioned at an output of the collimating lens configured to reflect a beam transmitted by the collimating lens system back to the collimating lens system.

13. The calibration system of claim 12, wherein the mirror includes a tip-tilt mount and is configured to be adjusted using the tip-tilt mount so the beam is reflected back towards the collimating lens.

14. The calibration system of claim 11, wherein the optical transmitter is a wavelength tunable laser.

15. The calibration system of claim 11, wherein the one or more processors are further configured to adjust, using the motor configured to move the tip of the optical fiber, a position of the tip of the optical fiber proximal to the collimating lens.

16. The calibration system of claim 15, wherein the one or more processors are further configured to secure the optical fiber relative to the collimating lens.

17. The calibration system of claim 16, wherein securing of the optical fiber includes fixing the optical fiber relative to the collimating lens.

18. The calibration system of claim 17, further comprising screws, bolts, or adhesives to fix the optical fiber relative to the collimating lens.

19. The calibration system of claim 11, further comprising a mechanical arm connecting the tip of the optical fiber with the motor.

20. The calibration system of claim 19, wherein the mechanical arm is a gimbal.

\* \* \* \* \*